United States Patent [19]
Kato

[11] Patent Number: 6,055,239
[45] Date of Patent: Apr. 25, 2000

[54] CONTROL METHOD FOR ESTABLISHING A PERMANENT VIRTUAL CONNECTION IN AN ATM NETWORK

[75] Inventor: Masaaki Kato, Kawasaki, Japan

[73] Assignee: Fujitsu Limited, Kanagawa, Japan

[21] Appl. No.: 08/949,153

[22] Filed: Oct. 10, 1997

[30] Foreign Application Priority Data

Mar. 18, 1997 [JP] Japan ................................. 9-065125

[51] Int. Cl.$^7$ ............................................. H04L 12/28
[52] U.S. Cl. .................... 370/409; 370/397; 709/243; 709/227
[58] Field of Search .................... 370/397, 399, 370/409; 379/901; 395/200.68, 200.57, 200.73; 709/238, 227

[56] References Cited

U.S. PATENT DOCUMENTS

| | | | |
|---|---|---|---|
| 5,392,402 | 2/1995 | Robrock, II | 709/227 |
| 5,452,296 | 9/1995 | Shimizu | 370/399 |
| 5,867,481 | 2/1999 | Miyagi | 370/244 |

*Primary Examiner*—Krisna Lim
*Assistant Examiner*—Kenneth R. Coulter
*Attorney, Agent, or Firm*—Helfgott & Karas, P.C.

[57] ABSTRACT

A control method for establishing a permanent virtual connection which can reduce an amount of management information stored in a network monitor, the management information being used for establishing the permanent virtual connection. The network monitor stores permanent virtual connection information. The permanent virtual connection information includes location information with respect to subscribers connected to the exchanges at opposite ends of the permanent virtual connection. The permanent virtual connection information further includes a virtual path identifier and a virtual channel identifier. A connection between the network monitor and each of the exchanges at opposite ends of the permanent virtual connection to be established is established in accordance with a third party call control. The permanent virtual connection information is sent to one of the exchanges at opposite ends of the permanent virtual connection to be established. Thus, the permanent virtual connection is established between the exchanges at opposite ends of the permanent virtual connection.

9 Claims, 19 Drawing Sheets

FIG. 2 PRIOR ART

| PERMANENT VIRTUAL CONNECTION MANAGEMENT INFORMATION | |
|---|---|
| SERVICE CLASS (QoS CLASS) | |
| LOCATION INFORMATION OF SUBSCRIBER a +VPI +VCI | (A+0+50) |
| TRUNK LINE LOCATION INFORMATION OF EXCHANGE A DIRECTED TO C+VPI+VCI | (X+1+51) |
| TRUNK LINE LOCATION INFORMATION OF EXCHANGE C DIRECTED TO A+VPI+VCI | (Y+1+51) |
| TRUNK LINE LOCATION INFORMATION OF EXCHANGE C DIRECTED TO B+VPI+VCI | (Z+2+52) |
| TRUNK LINE LOCATION INFORMATION OF EXCHANGE B DIRECTED TO C+VPI+VCI | (W+2+52) |
| LOCATION INFORMATION OF SUBSCRIBER b +VPI +VCI | (B+0+100) |
| REQUIRED BANDWIDTH VALUE CONNECTION | |
| (OTHERS) | |

FOR NUMBER OF PERMANENT VIRTUAL CONNECTIONS

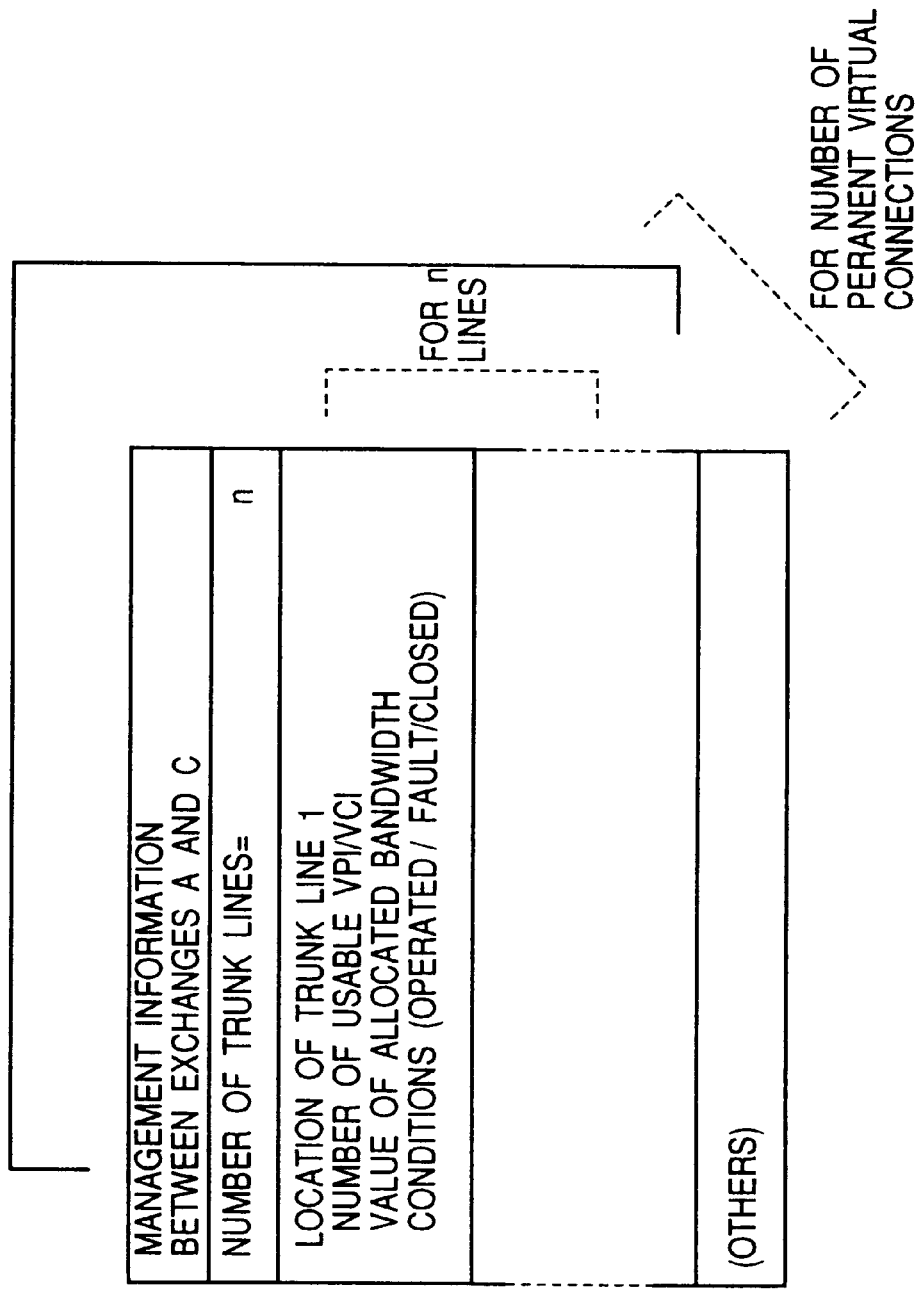

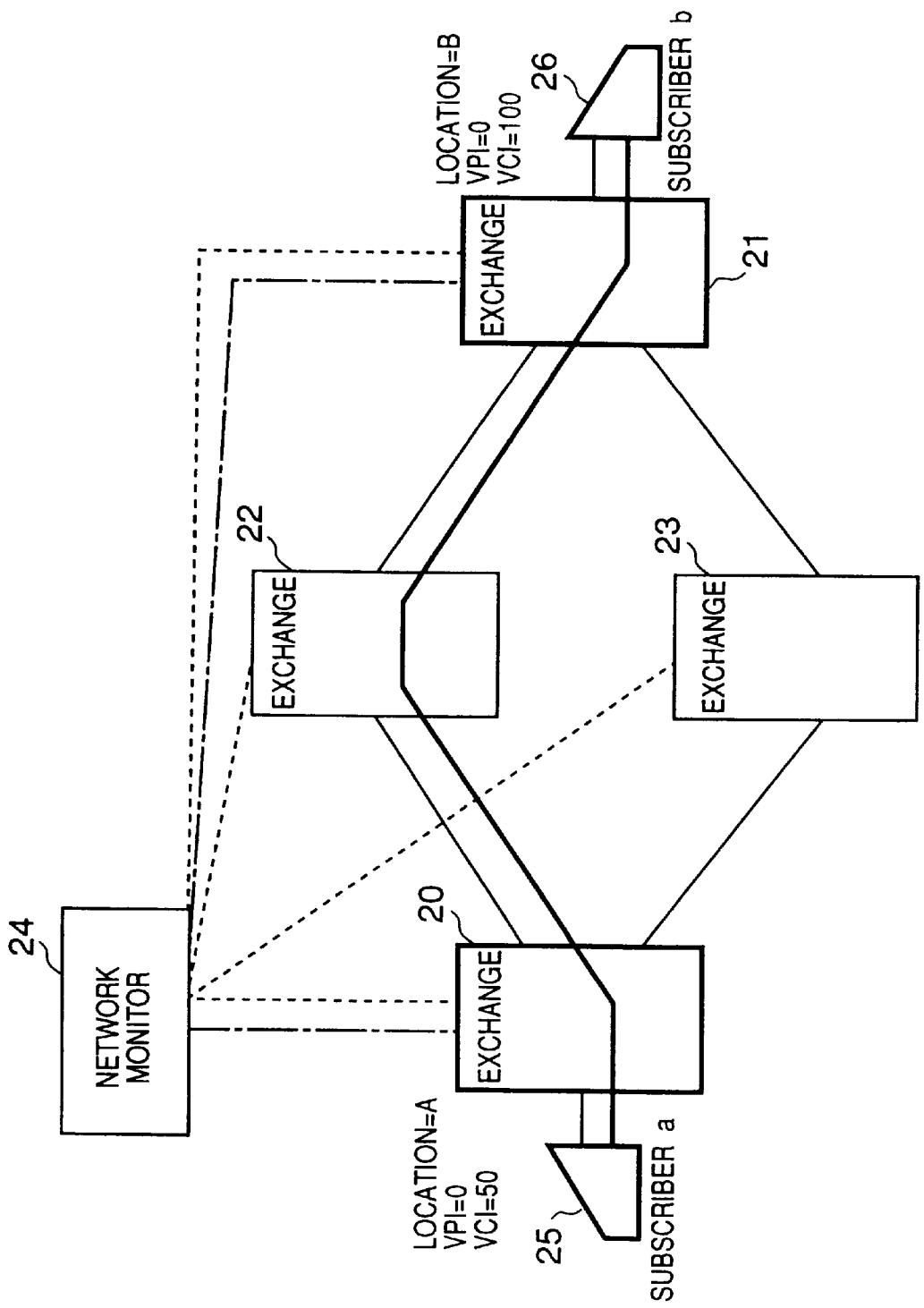

FIG. 7

| PERMANENT VIRTUAL CONNECTION MANAGEMENT INFORMATION |
|---|
| SERVICE CLASS (QoS CLASS) |
| LOCATION OF SUBSCRIBER a +VPI +VCI      (A+0+50) |
| LOCATION OF SUBSCRIBER b +VPI +VCI      (B+0+100) |
| REQUIRED BANDWIDTH VALUE CONNECTION |
| (OTHERS) |

FOR NUMBER OF PERMANENT VIRTUAL CONNECTIONS

FIG. 11A

PATH PRIORITY TABLE

| DIRECTED TO EXCHANGE B |
|---|
| FIRST PRIORITY PATH = PATH I |
| SECOND PRIORITY PATH = PATH II |
| ... |

FOR EACH ADJACENT EXCANGES

FIG. 11B

PATH STATE TABLE

| PATH I | FAULT(UNUSABLE) |
| PATH II | NORMAL |
| ... | ... |

FIG. 14A

PATH PRIORITY TABLE

| DIRECTED TO EXCHANGE B |
|---|
| FIRST PRIORITY PATH = PATH I |
| SECOND PRIORITY PATH = PATH II |
| . . . |

FOR EACH ADJACENT EXCANGES

FIG. 14B

PATH STATE TABLE

| PATH I | FAULT(UNUSABLE) | . . . |
|---|---|---|
| PATH II | FAULT(UNUSABLE) | |
| . . . | | . . . |

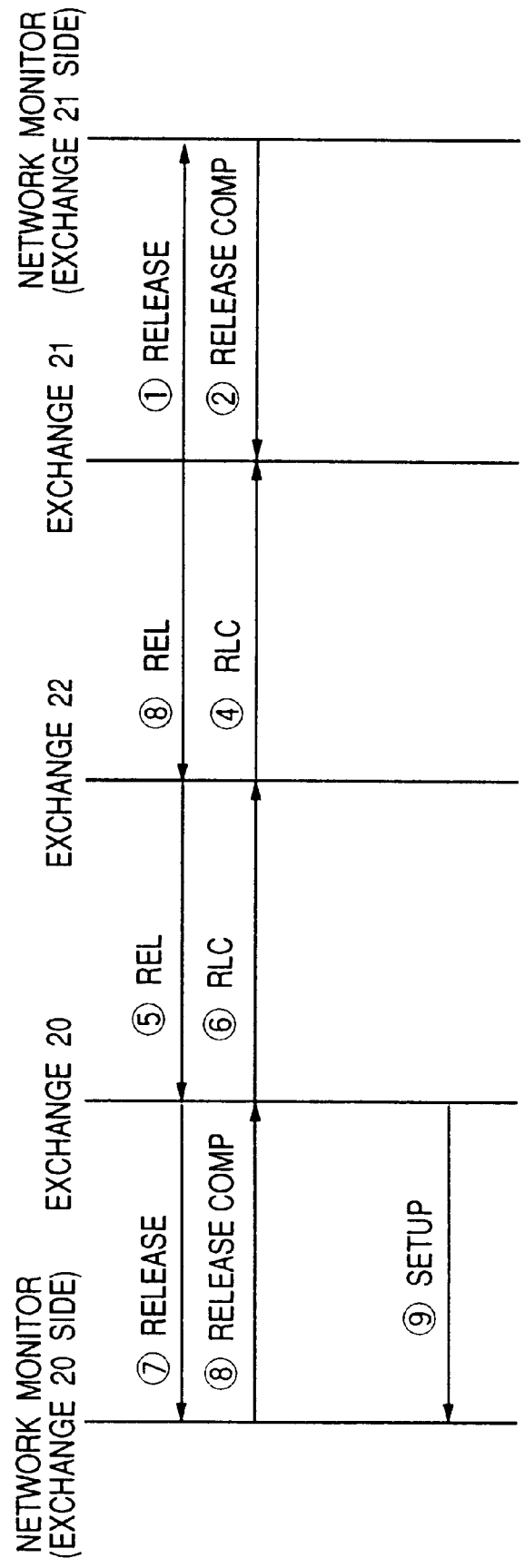

CONTROL METHOD FOR ESTABLISHING A PERMANENT VIRTUAL CONNECTION IN AN ATM NETWORK

BACKGROUND OF THE INVENTION

1. Field of the Invention

The present invention relates to a control method for establishing a permanent virtual connection and, more particularly, to a control method for establishing a permanent virtual connection in an ATM network.

Standardization of Asynchronous Transfer Mode (ATM) switching has been progressed by organizations such as ITU-T or the ATM forum in order to establish a technology for constructing a Broadband aspects of Integrated Service Digital Network (B-ISDN). It is desired for the B-ISDN to provide more reliable services by maintaining a connection with a particular party and allowing a restart of a communication in a short time when a fault occurs in the network.

2. Description of the Related Art

Conventionally, in an ATM network, a Permanent Virtual Connection is used for a connection between a subscriber and a subscriber exchange and a connection between exchanges in the network. A Virtual Path Identifier (VPI) and a Virtual Channel Identifier (VCI), which are used or identifying a Virtual Channel and a Virtual Path, are determined when a connection is established between paths, subscribers and exchanges. The VPI and VCI are identifier provided in a header of an ATM cell which has fixed length. The VPI and VCI are used for distinguishing a cell transferred along a connection from a cell transferred along a different connection. Information with respect to paths and the VPI and VCI is managed as a database of a network monitor. Each device located on the paths which constitute a network is provided with data, as a service order, from the network monitor.

FIG. 1 is an illustration of a structure of an ATM network. In FIG. 1, an exchange 10 is connected to each of the exchanges 12 and 13 by a path, and each of the exchanges 12 and 13 is connected to an exchanger 11 by a path. Each of the exchanges 10–13 is connected to a network monitor 14 so that the service order is provided to the exchanges 10–13 and notification is sent from the exchanges 10–13 to the network monitor 14. When a connection is made between subscribers 15 and 16 by the PVC, a route following the exchangers 10, 12 and 11, in that order, is established, for example. In this case, permanent path connection management information shown in FIGS. 2 and 3 is registered in the database of the network monitor 14.

In the conventional Permanent Virtual Connection, the paths and the VPI and VCI are previously determined, and are managed as a database. Thus, when an incommunicable condition occurs in a part of the network and when the connection is reestablished to restart a communication, there are problems described below. It should be noted that the incommunicable condition herein includes a temporary stop of service of a particular connection line or an interface due to a maintenance as well as a fault of a trunk line between exchanges and a stop of service due to system down of an exchange.

(1) In order to determine whether or not a connection is influenced by an incommunicable state in a network, that is, to determine whether or not reestablishment of a connection is required, the network monitor must be provided with trunk line position information of each exchange or discrimination information of each trunk exchange shown in FIG. 2 so as to discriminate each of the permanent virtual connections. This increases an amount of data to be managed for a single connection. In FIG. 2, the location information and the VPI and VCI are parenthesized. The values of the location information and the VPI and VCI correspond to that shown in FIG. 1.

(2) In order to announce to the network monitor the location where the incommunicable condition occurs, all of the devices constituting the network must be provided with the same interface regardless of their scale, or the network monitor must have a function to interpret interface information of each of the devices. In either case, versatile and detailed protocol is needed to put in practice, and a lot of time is required to achieve such a scheme.

Even if the above-mentioned problems are solved and the connection influenced by the incommunicable condition can be discriminated, there are problems as described below when an attempt is made to restart a communication, that is, to reestablish the connection.

(3) In order to reestablish the connection, it is required to select paths to detour the location of the incommunicable condition and the corresponding VPI and VCI. This requires a search for selectable paths for all detours. It is possible that the paths selected as a detour pass a different trunk exchange. Accordingly, the network monitor must have information with respect to the entire structure of the network and usable connection paths which are obtained by combinations as shown in FIG. 3. Thus, a large data base is needed, and a high-speed search logic is needed for minimize a time period of interruption of service.

(4) When a selection of paths is made for reestablishing the connection as mentioned in item (3), it is required for the network monitor to check if bandwidth, which is necessary for the connection on each path constituting the selected path and each device in the network, is assignable. However, there is a case in which the check of the network monitor cannot be performed since a Selection Virtual Connection (SVC) may be established along the paths, devices and trunk lines. Generally, a band assigned to the SVC is not monitored by the network monitor.

(5) In order to eliminate the problem mentioned in item (4), there is a method in which a trunk line or an application for each VPI in the trunk line is separated to classify into one for the PVC and one for the SVC. Even when such a method is used, the network monitor must know a calculation method of allocating a band for each of the devices since the calculation method may differ from device to device. That is, there is a problem in that the network monitor must calculate by an appropriate calculation method for each device which constitutes the selected path which condition is not preferable for a practical operation and operational speed. The calculation method for allocating bandwidth is dependent on the system for transmitting a cell in the device, and it is known that a plurality of systems are present.

As different methods, there are procedures such as an Automatic Protection Switch (APS) and a soft PVC as a means for switching a communication channel at a short time.

(6) The APS requires a complete spare channel. Accordingly, a cost is increased since the spare channel cannot be used in a normal condition. Additionally, since the APS procedure itself is a switching procedure defined on a specific frame format such as SONET or SDH, there is a problem that the APS procedure cannot be used for an interface having a frame format other than the specific frame format.

(7) With regard to the soft PVC, there is a problem in that all of the ATM exchanges constituting the network must be provided with a function to control the soft PVC.

SUMMARY OF THE INVENTION

It is a general object of the present invention to provide a useful and improved control method for establishing a permanent virtual connection in which the above mentioned problems are eliminated.

A more specific object of the present invention is to provide a control method for establishing a permanent virtual connection which can reduce an amount of management information stored in a network monitor, the management information being used for establishing the permanent virtual connection.

Another object of the present invention is to provide a control method for establishing a permanent virtual connection which a reestablishment of the permanent virtual connection is automatically performed so as to recover a fault in a short time.

In order to achieve the above-mentioned objects, there is provided according to one aspect of the present invention a method for controlling an establishment of a permanent virtual connection in an ATM network which includes a plurality of exchanges, connections between the exchanges being monitored and controlled by a network monitor, the method comprising the steps of:

a) storing permanent virtual connection information in the network monitor, the permanent virtual connection information including location information with respect to subscribers connected to the exchanges at opposite ends of the permanent virtual connection, the permanent virtual connection information further including a virtual path identifier and a virtual channel identifier;

b) establishing a connection between the network monitor and each of the exchanges at opposite ends of the permanent virtual connection to be established in accordance with a third party call control;

c) sending the permanent virtual connection information to one of the exchanges at opposite ends of the permanent virtual connection to be established; and d) establishing a connection between the exchanges at opposite ends of the permanent virtual connection.

According to the above-mentioned invention, the information stored in the network monitor to control the establishment of the permanent virtual connection includes the location information of the exchanges at opposite ends of the permanent virtual connection and the virtual path identifier and the virtual channel identifier. Accordingly, management information with respect to the exchanges between the exchanges at opposite ends of the permanent virtual connection is not needed to be stored in the network monitor. Thus, the amount of management information stored in the network monitor is reduced.

In one embodiment of the present invention, each of the plurality of exchanges may include table information with respect to a priority order and a state of paths connected to other exchanges so that the connection is established by selecting one of other exchanges in accordance with the table information.

The method according to the present invention may further comprise the steps of:

e) announcing a release of the permanent virtual connection to the network monitor from the exchanges at opposite ends of the permanent virtual connection when the permanent virtual connection has become an incommunicable state;

f) reestablishing the connection between the network monitor and each of the exchanges at opposite ends of the permanent virtual connection;

g) sending the permanent virtual connection information to one of the exchanges at opposite ends of the permanent virtual connection which has been released; and h) reestablishing the connection between the exchanges at opposite ends of the permanent virtual connection which has been released.

According to the above-mentioned invention, when the initially set permanent virtual connection becomes the incommunicable state, the connection is automatically reestablished by selecting normal paths. Thus, an interruption period of service can be minimized since the reestablishment of the connection is performed in a short time.

In one embodiment of the present invention, a second attempt for a reestablishment of the permanent virtual connection may be delayed for a predetermined time when a first attempt for the reestablishment has failed. Additionally, a reestablishment of the permanent virtual connection may be prohibited when a notification is sent to the network monitor that a fault occurs in one of the subscribers related to the permanent virtual connection which is in the incommunicable state. Accordingly, a load applied to the exchanges and the network monitor can be minimized.

Additionally, a reestablishment of the connection between the exchanges at opposite ends of the permanent virtual connection may be started when a notification is received that the fault of the one of the subscriber has been recovered.

Further, a start and stop of an establishment of the permanent virtual connection may be instructed by a maintenance order input through the network monitor.

Additionally, there is provided according to another aspect of the present invention a method for controlling an establishment of a permanent virtual connection in an ATM network which includes a plurality of exchanges, a communication is performed between two of the exchanges through the permanent virtual connection routing a plurality of the exchanges, connections between the exchanges being monitored and controlled by a network monitor, the method comprising the steps of:

a) sending a request for setting a connection between the exchanges which are connected to terminals which performs a communication with each other via the permanent virtual connection when a fault occurs in the permanent virtual connection;

b) setting a connection between the one of the exchanges which received the request and the other one of the exchanges by routing a different path; and c) recognizing the connection set in step b) as a new permanent virtual connection so that the network monitor monitors and controls the connection between the exchanges based on information with respect to the new permanent virtual connection.

According to the above-mentioned invention, if a fault occurs in the permanent virtual connection, a new permanent virtual connection is automatically reestablished to resume the service.

Other objects, features and advantages of the present invention will become more apparent from the following detailed description when read in conjunction with the accompanying drawings.

BRIEF DESCRIPTION OF THE DRAWINGS

FIG. 2 is an illustration for explaining management information of permanent virtual connections;

FIG. 3 is an illustration for explaining management information of permanent virtual connections;

FIG. 4 is an illustration of a structure of an ATM network to which a control method according to the present invention is applied;

FIG. 7 is an illustration for explaining permanent virtual connection management information;

FIG. 11A is an illustration of a path priority table; FIG. 11B is an illustration of a path state table;

FIG. 14A is an illustration of a path priority table; FIG. 14B is an illustration of a path state table;

FIG. 19 is a sequence chart of the control sequence according to the present invention.

DETAILED DESCRIPTION OF THE PREFERRED EMBODIMENTS

Figure 1:
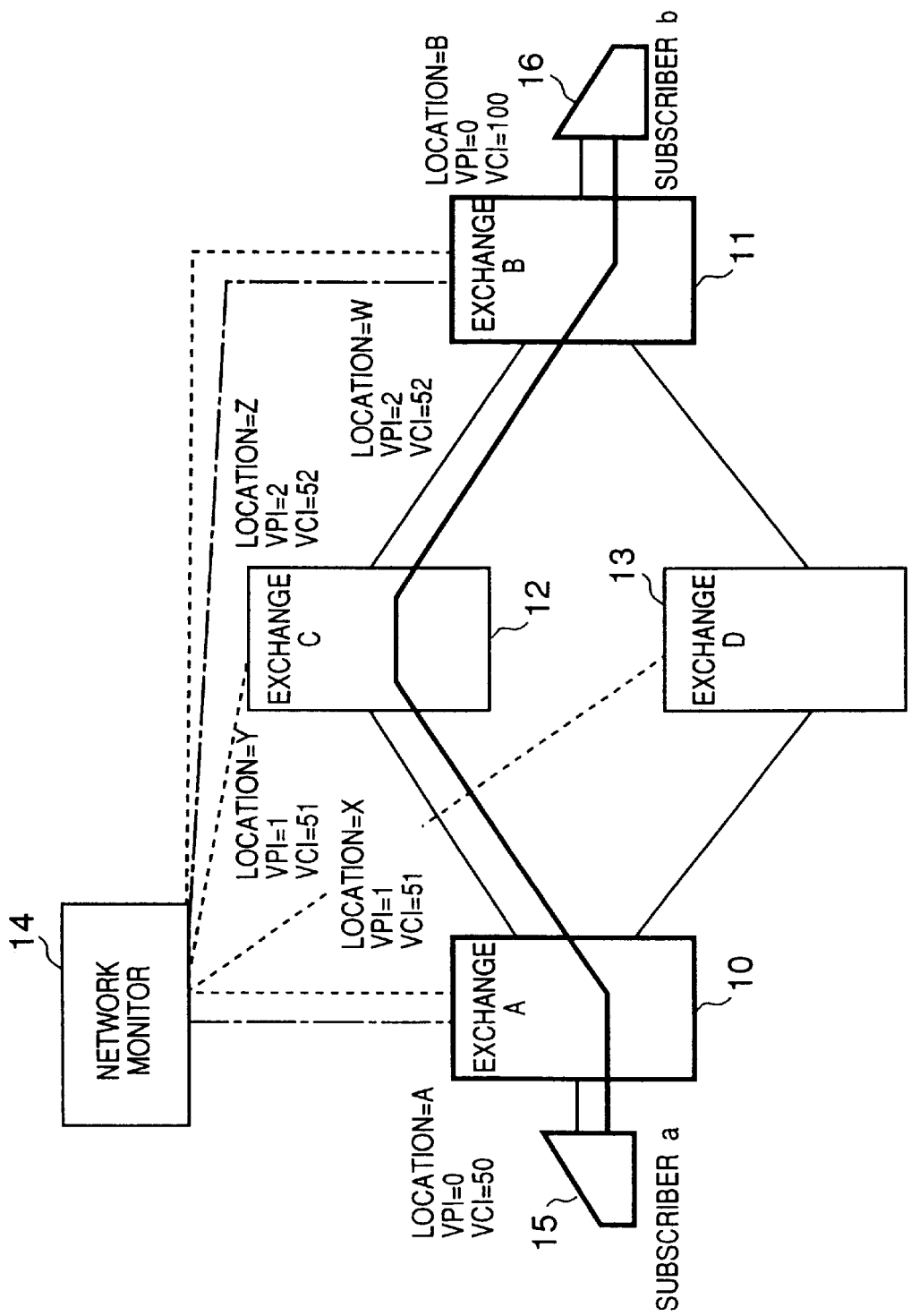
FIG. 1 is an illustration of a structure of a conventional ATM network.

FIG. 4 is an illustration of a structure of an ATM network to which a control method according to the present invention is applied. In FIG. 2, an exchange 20 is connected to each of the exchanges 22 and 23 by a path. Each of the exchanges 22 and 23 is connected to an exchange 21 by a path. Additionally, each of the exchanges 20–23 is connected to a network monitor 24 by a connection for sending a notification of fault as indicated by dotted lines. When a connection is established between a subscriber 25 connected to the exchange 20 and a subscriber 26 connected to the exchange 21, an SVC for a third party call control is established, as indicated by single dashed chain lines, between the network monitor 24 and each of the exchanges 20 and 21. The third party call control means that a party (network monitor 24) other than the main party (subscriber 25) involved in a communication controls a call when the subscriber 25 performs communication with the subscriber 26.

Figure 5:
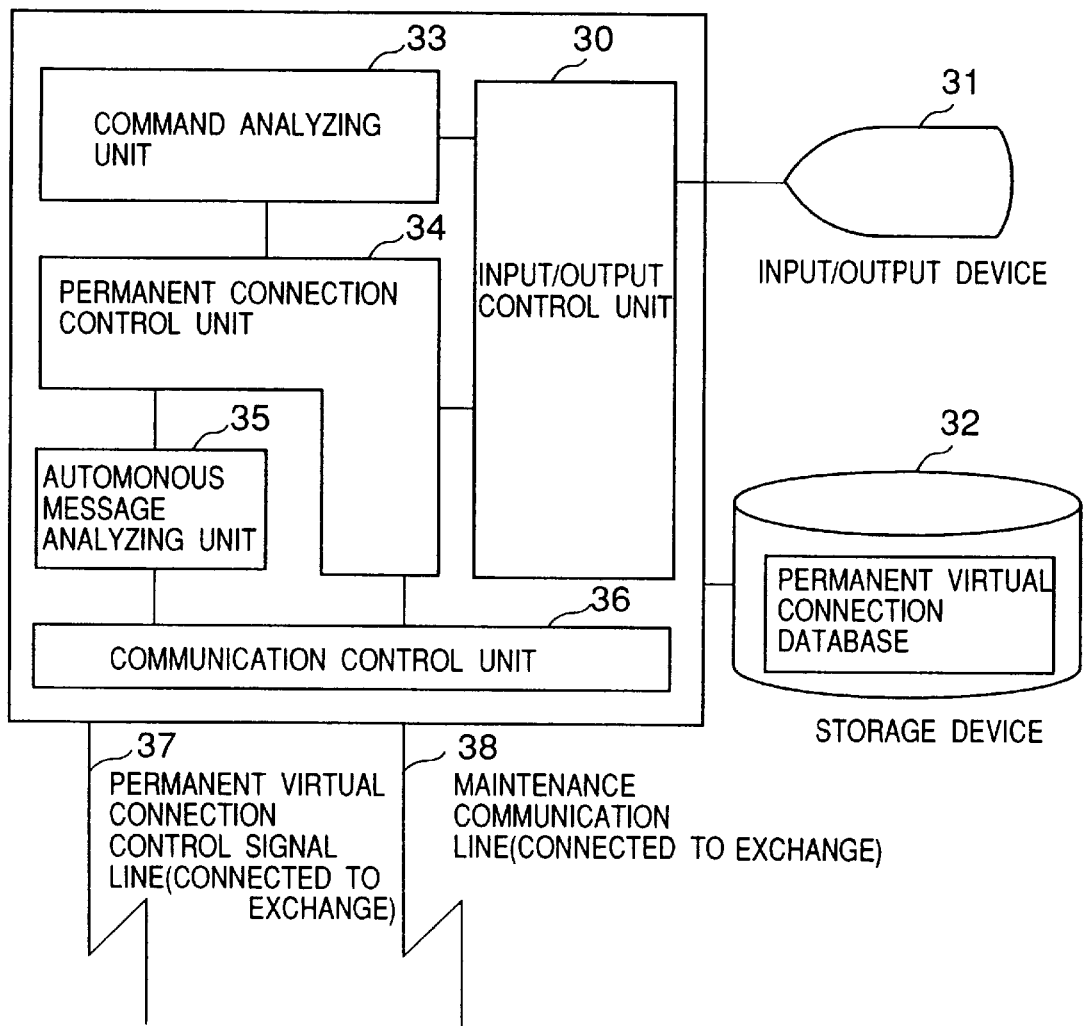
FIG. 5 is an illustration for explaining a structure of a network monitor shown in FIG. 4.

FIG. 5 is an illustration for explaining a structure of the network monitor 24. In FIG. 5, an input/output control unit 30 controls an input/output operation for an input/output device 31 and a general input/output operation of a memory device 32. The input/output device 31 comprises a console which inputs a maintenance order such as a permanent connection setting start/stop command and a printer for outputting an autonomous message. The memory device 32 stores a connection data base. A command analyzing unit 33 analyzes a maintenance order command input through the input/output device 31 by a maintenance person. A permanent connection control unit 34 controls establishment of a permanent virtual connection.

An autonomous message analyzing unit 35 receives a notification of an occurrence of a fault or a restoration of the fault which is sent from an exchange so as to notify the permanent connection control unit 34 a part needed for analysis and the occurrence/restoration of the fault. A communication control unit 36 sends a maintenance order to exchanges, and receives from the exchanges the autonomous message which is the notification of occurrence/restoration of a fault. The communication control unit 36 also controls a transmission and reception of an SVC signal for the permanent connection control. In this embodiment, although the communication control unit 36 is connected to each of the exchanges by separating a permanent connection control signal line 37 from a maintenance communication line 38, these lines may be a virtual connection using the PVC on the same path.

Figure 6:
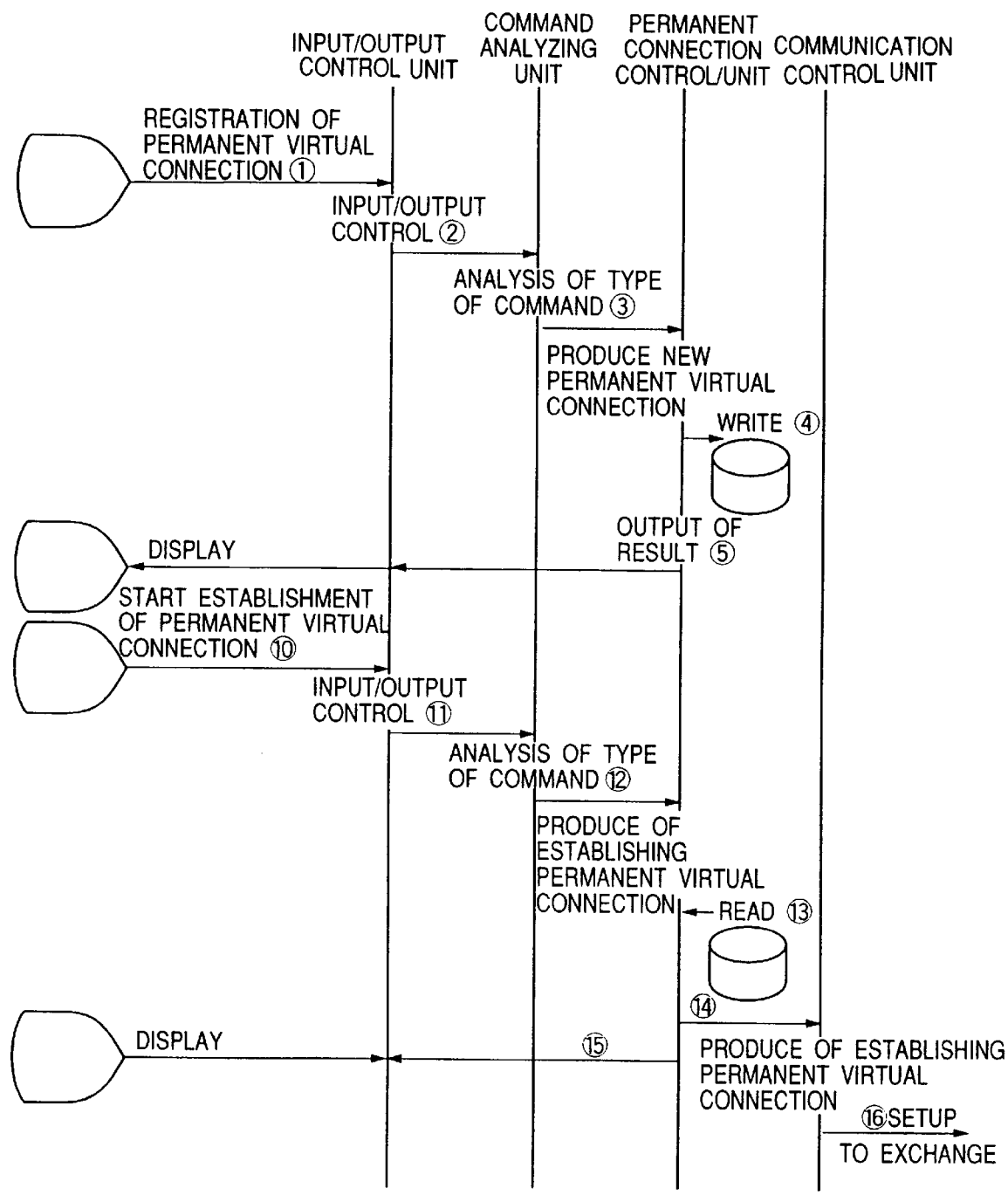
FIG. 6 is a sequence chart for registration of permanent virtual connection information and starting an establishment of the permanent virtual connection.

FIG. 6 is an illustration for explaining a sequence of an operation for establishing a permanent virtual connection by registering the permanent virtual connection to the network monitor. In FIG. 6, a step number is indicated in a circle.

When the sequence is started, information of a permanent virtual connection to be registered is input from the input/output control unit 30 in sequence step 1. Then, in sequence step 2, the information is supplied from the input/output control unit 30 to the command analyzing unit 33 so that a type of command is analyzed. The command analyzing unit 33 announces the result of analysis to the permanent connection control unit 34 in sequence step 3. The permanent connection control unit 34 produces new permanent virtual connection data (permanent virtual connection management information). In sequence step 4, the newly produced permanent virtual connection data is written in the permanent virtual connection database of the memory device 32. Then, the permanent connection control unit 34 supplies the newly produced permanent virtual connection data to the input/output unit 31 via the input/output control device 31 so as to display the contents of the registered data.

When registration of the permanent virtual connection between the subscribers 25 and 26 routing the exchanges 20, 22 and 21 as shown in bold solid lines of FIG. 4 is made, the permanent virtual connection management information shown in FIG. 7 is written in the memory device 32. The permanent virtual connection management information includes, as shown in FIG. 7, the service class, the location of the subscriber 25 and the VPI and VCI (A+0+50), the location of the subscriber 26 and the VPI and VCI (B+0+100), the required band value of the connection and other information.

When a permanent virtual connection establishment command is input from the input/output device 31 in sequence step 10, the command is input from the input/output control unit 30 to the command analyzing unit 33, in sequence step 11, so that a type of the command is analyzed. The command analyzing unit 33 announces the result of the analysis to the permanent connection control unit 34 in sequence step 12. Thus, the permanent virtual connection data is read, in sequence strep 13, from the permanent virtual connection database of the memory device 32. The permanent connection control unit 34 sends the permanent virtual connection data to the communication control unit 36 in sequence step 14. Then the permanent connection control unit 34 sends an instruction to the input/output device 31 so as to display a message indicating a start of establishment of the permanent virtual connection. The communication control unit 36 controls a predetermined exchange to perform a call setting operation by a third party call control.

Figure 8:
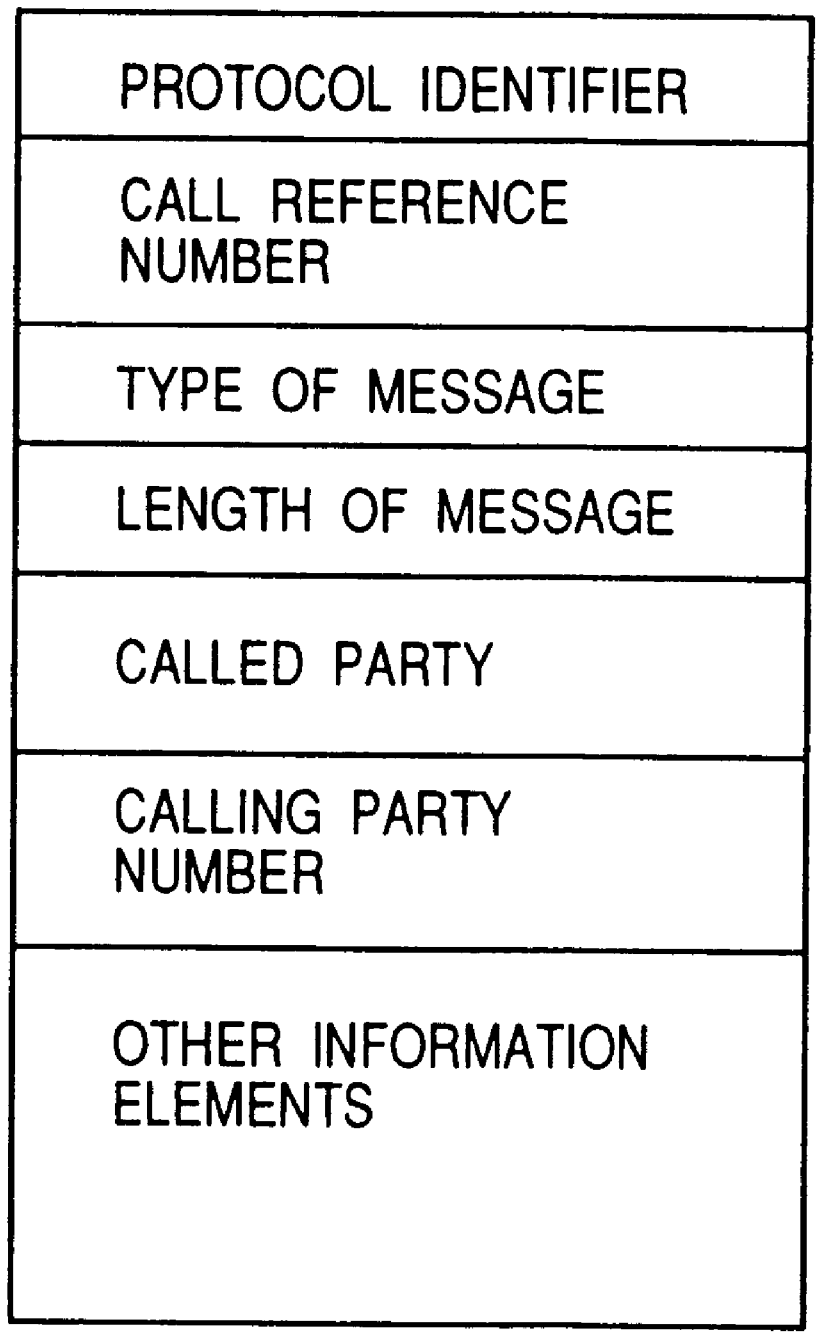
FIG. 8 is an illustration for explaining a format of a call control message.

FIG. 8 is an illustration of a format for a call control. In FIG. 8, a protocol identifier at the top indicates that the followed data is a call control message. The following call reference number is provided for determining to which the message is sent. The type of message is provided for discriminating a function of the message such as a call setting or a calling. The message length indicates a length of the message. The called party number designates a party to communicate with. The calling party number designates the calling party. Other information elements indicate a virtual path connection identifier (VPCI)/virtual channel identifier (VCI), an ATM cell rate, a broadband bearer capability (B-BC) and a service class (QoS class).

Figure 9:
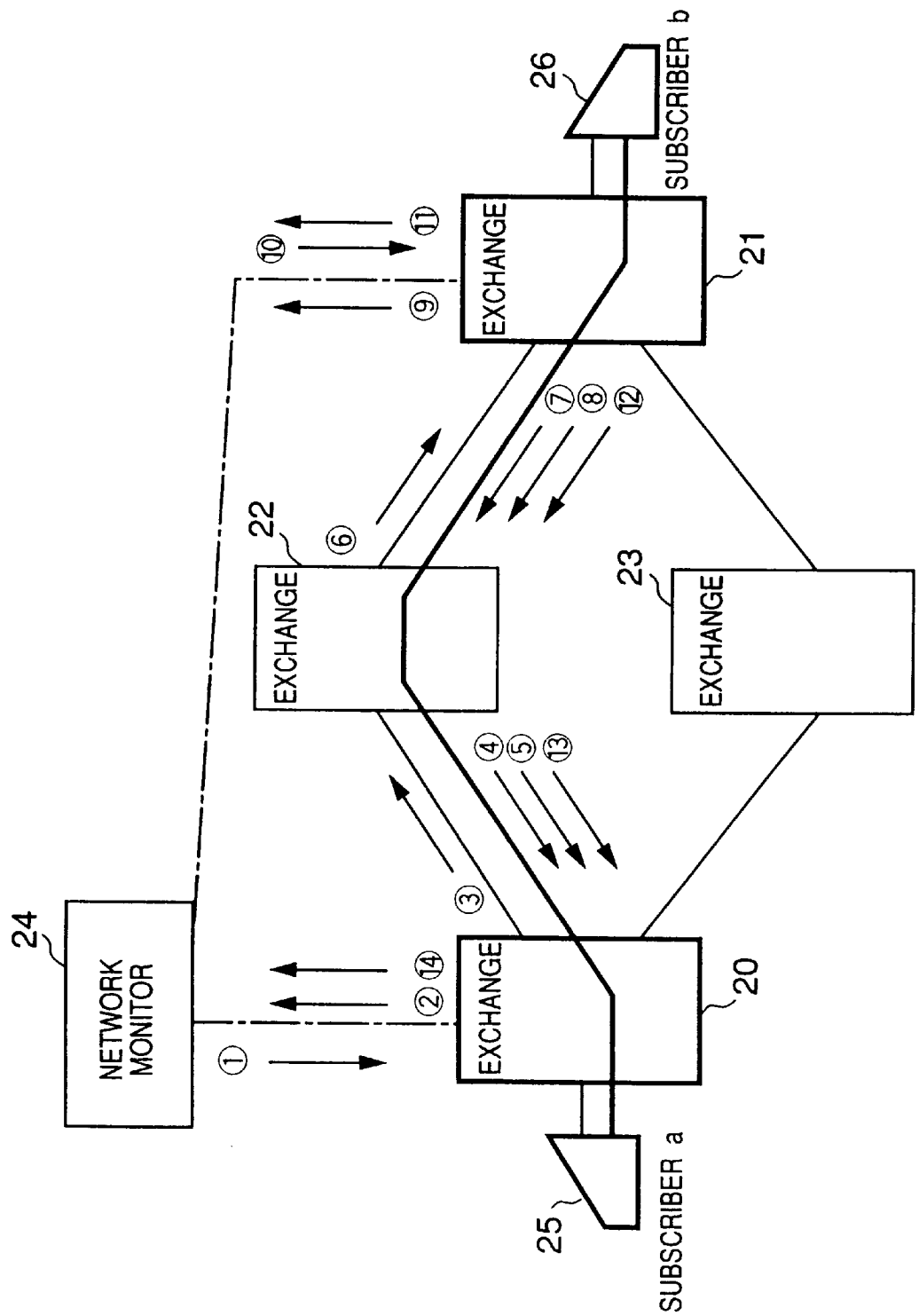
FIG. 9 is an illustration for explaining a control sequence according to the present invention.
Figure 10:
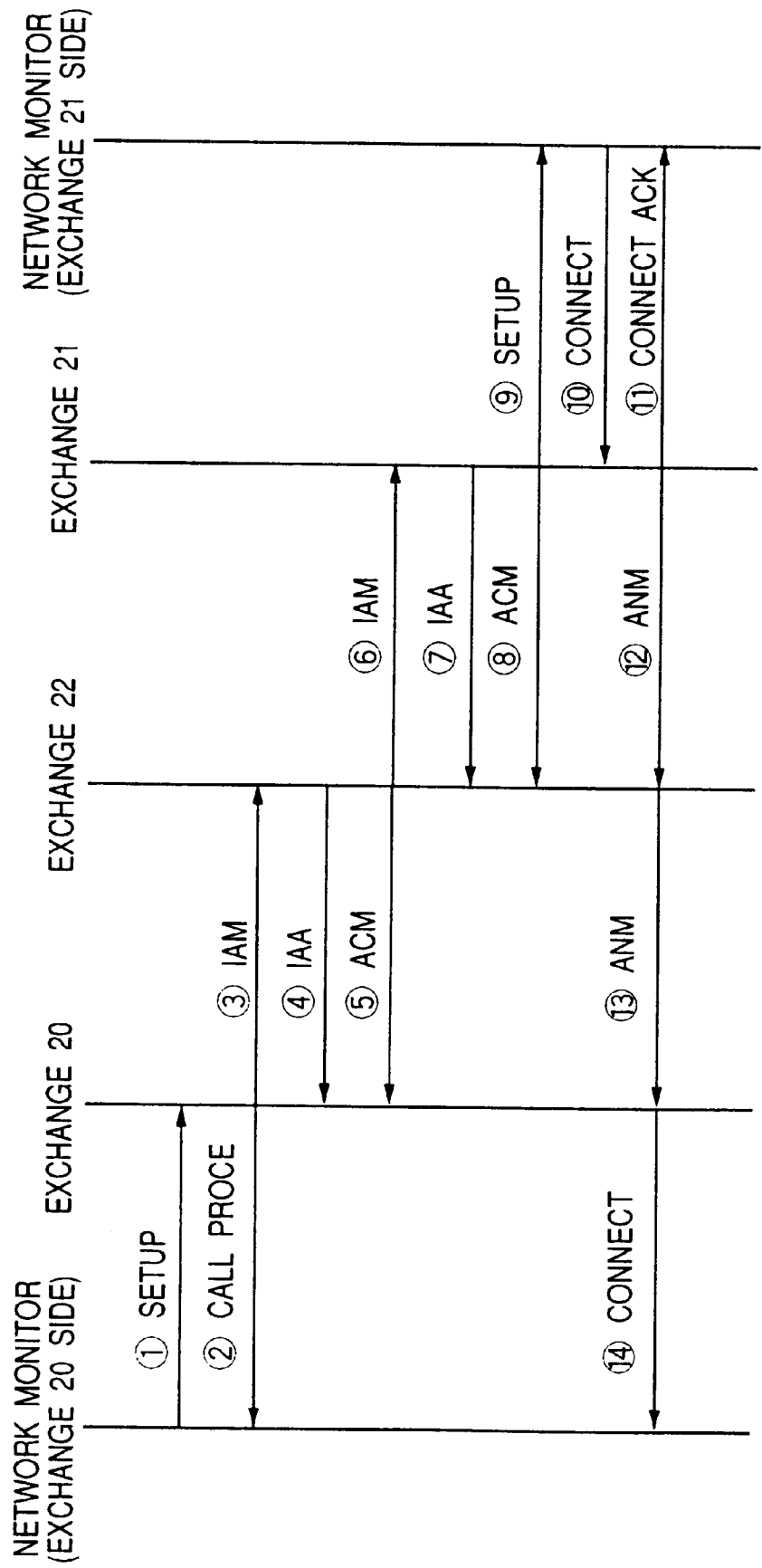
FIG. 10 is a sequence chart of the control sequence according to the present invention.

A description will now be given, with reference to FIGS. 9 and 10, of a setting operation of the permanent virtual connection between the subscribers 25 and 26 in which a remote party is fixed. First, permanent virtual connection information to be set as shown in FIG. 7 is searched in the permanent virtual connection database. Then the setting operation is started based on the searched permanent virtual connection information. In FIGS. 9 and 10, a sequence step number is indicated in a circle.

Sequence Step 1:
The network monitor 24 announces to the exchanger 20 the locations of the subscriber 26 and the subscriber 25+the VPI and VCI to be used and the required bandwidth value by an information element included in a SETUP message. Thereby, the exchange 20 performs bandwidth allocation for the subscriber 25.

Sequence Step 2:
The exchanger 20 sends a notification of reception to the network monitor 24 by a CALL PROC message. The exchange 20 selects a path which can reach the subscriber 26, and performs a band allocation for the trunk line.

Sequence Step 3:
The exchanger 20 announces the remote party (subscriber 26) and the required bandwidth value to the exchange 22 by an information element included in an IAM message. The exchange 22 performs bandwidth allocation for the channel toward the exchange 20.

Sequence Step 4:
The exchange 22 sends a notification of the receipt of the IAM message to the exchange 20 by an IAA message.

Sequence Step 5:
The exchange 22 announces completion of reception of the information of the remote party to the exchange 20 by an ACM message. The exchange 22 selects a path which can reach the subscriber 26, and performs bandwidth allocation for the trunk line.

Sequence Step 6:
The exchanger 22 announces the remote party (subscriber 26) and the required bandwidth value to the exchange 21 by an information element included in an IAM message. The exchange 21 performs bandwidth allocation for the channel toward the exchange 20.

Sequence Step 7:
The exchange 21 sends a notification of the receipt of the IAM message to the exchange 22 by an IAA message.

Sequence Step 8:
The exchange 21 announces completion of reception of the information of the remote party to the exchange 22 by an ACM message. The exchange 21 detects the location of the subscriber 26.

Sequence Step 9:
The exchange 21 announces the remote party (subscriber 25) to the network monitor 24 by an information element included in a SETUP message. The network monitor 24 searches for the permanent virtual connection information to be set based on the remote party, and determines the VPI and VCI to be used on the side of the subscriber 26.

Sequence Step 10:
The network monitor 24 announces the VPI and VCI to the exchange 21 by an information element included in a CONNCT message. Thereby, the exchanger 21 starts bandwidth allocation for the path to the subscriber 26, and starts a transmission of a cell.

Sequence Step 12:
The exchange 21 announces completion of the setting of the connection to the network monitor 24 by a CONNECT ACK message. Thereby, the exchange 22 starts a transmission of cells.

Sequence Step 13:
The exchange 22 announces the start of the transmission of cells to the exchange 20 by an ANM message. Thereby, the exchange 20 starts a transmission of cells toward the subscriber 25.

Sequence Step 14:
The exchange 20 announces the start of the transmission of cells to the network monitor 24 by a CONNECT message.

Each of the exchanges 20–23 is provided with a data table which is used for routing between the SVC exchanges. For example, a path priority table shown in FIG. 11A and a path state table shown in FIG. 11B are provided in the exchange 20. The path priority table is prepared for each of the exchanges 21 to 23. In the path priority data table, a route from the exchange 20 to the exchange 21 via the exchange 22 is set as the first priority path (path I) and a route from the exchange 20 to the exchange 21 via the exchange 23 is set as the second priority path (path II). The path state table represents a state of each of the paths.

Figure 12:
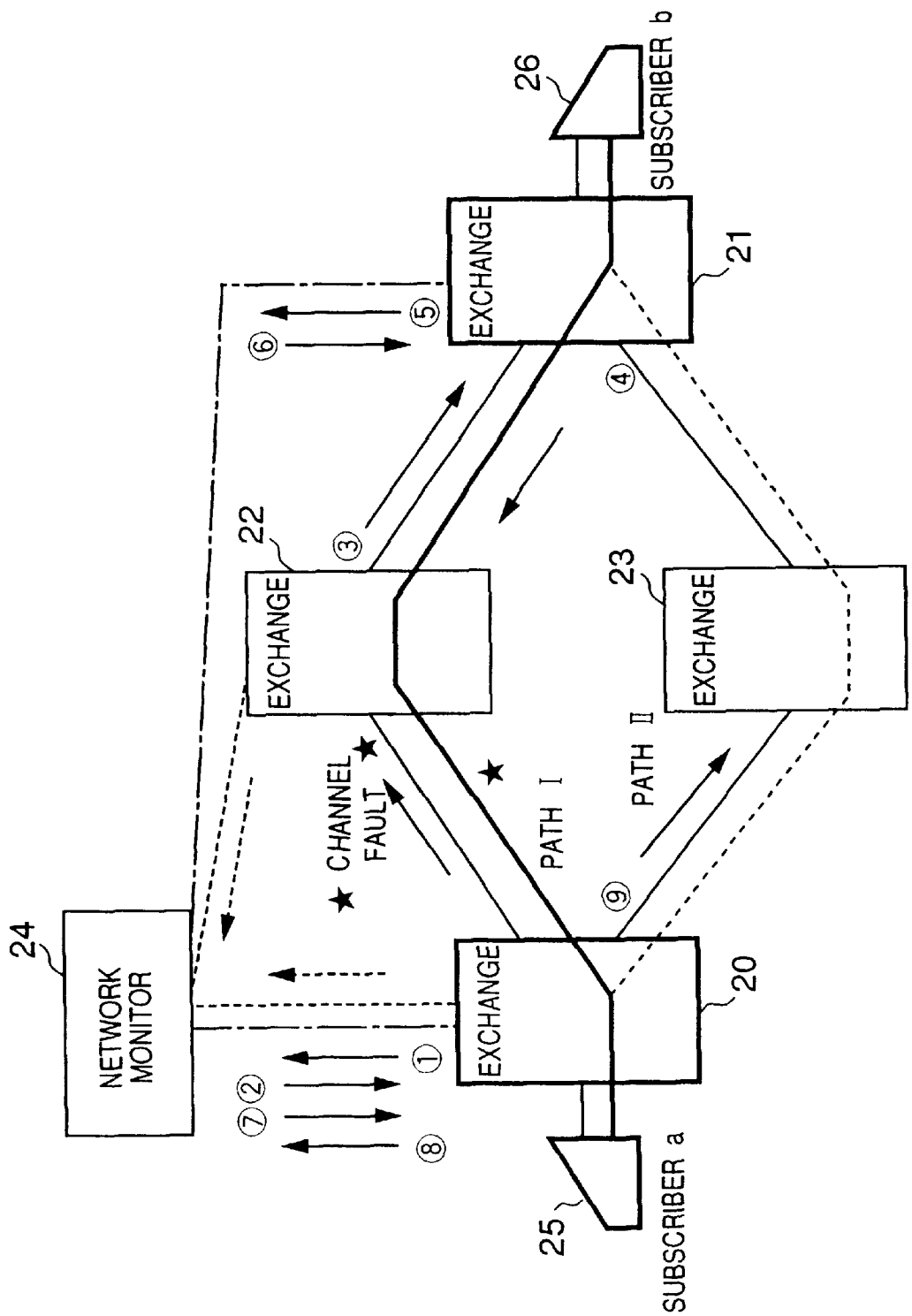
FIG. 12 is an illustration for explaining a control sequence according to the present invention.
Figure 13:
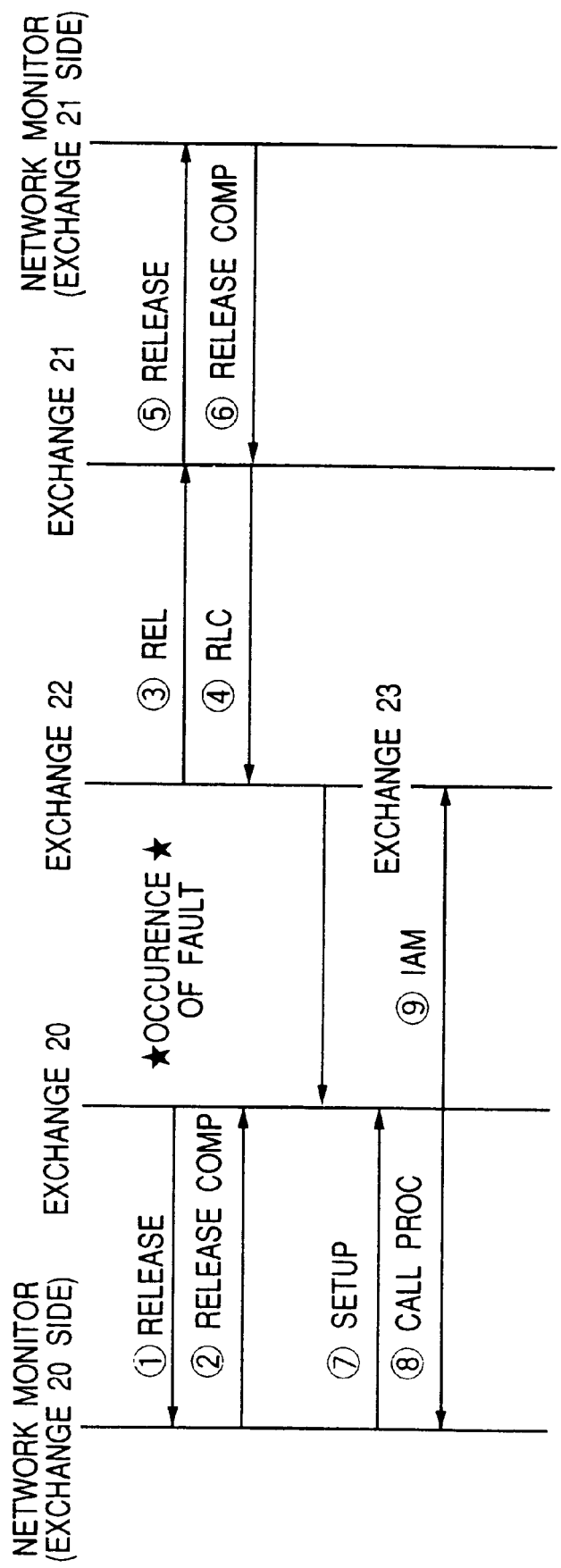
FIG. 13 is a sequence chart of the control sequence according to the present invention.

A description will now be given, with reference to FIGS. 12 and 13, of a reestablishing operation of a permanent virtual connection when a fault occurs in a part of a connection between the subscribers 25 and 26 via the exchanges 20, 22 and 21. It is assumed that the fault occurs in the channel between the exchanges 20 and 22. In this case, a notification of the occurrence of the fault in the channel toward the exchange 22 is sent to the network monitor 24 from the exchange 20, and a notification of the occurrence of the fault in the channel toward the exchange 20 is sent to the network monitor 24 from the exchange 22. In FIGS. 12 an 13, a sequence step number is indicated in a circle.

Sequence Step 1:
The exchange 20 announces a release of the connection of the subscriber 25 to the network monitor 24 by a RELEASE message.

Sequence Step 2:
The network monitor 24 announces completion of the release of the connection to the exchange 20 by a RELEASE COMP message.

Sequence Step 3:
The exchange 22 announces a release of the connection of the subscriber 25 to the exchange 21 by an REL message.

Sequence Step 4:

The exchange 21 announces completion of the release of the connection to the exchange 22 by an RLC message.

Sequence Step 5:

The exchange 21 announces a release of the connection of the subscriber 26 to the network monitor 24 by a RELEASE message.

Sequence Step 6:

The network monitor 24 announces completion of the release of the connection to the exchange 21 by a RELEASE COMP message. At this time, the network monitor 24 determines that reestablishment of the connection between the subscribers 25 and 26 is needed.

Sequence Step 7:

The network monitor 24 announces to the exchanger 20 the locations of the subscriber 26 and the subscriber 25+the VPI and VCI to be used and the required bandwidth value by an information element included in a SETUP message. Thereby, the exchange 20 performs a band allocation for the subscriber 25.

Sequence Step 8:

The exchanger 20 sends a notification of reception to the network monitor 24 by a CALL PROC message. The exchange 20 selects a path which can reach the subscriber 26, and performs bandwidth allocation for the trunk line. At this time, since it is determined that the path routing the exchange 22 is not usable in accordance with the table shown in FIG. 11B, the path routing the exchange 23 is selected. That is, the paths I and II in the path state table shown in FIG. 11B are checked by referring the first and second priority paths in the path priority table shown in FIG. 11A, in that turn. As a result, the route via the exchange 23 is selected.

Sequence Step 9:

The exchanger 20 announces the remote party (subscriber 26) and the required band value to the exchange 23 by an information element included in an IAM message.

Thereafter, a connection between the subscribers 25 and 26 is established via the exchanges 20, 23 and 21 similar to the sequence steps 4 to 14 shown in FIG. 10.

Figure 15:
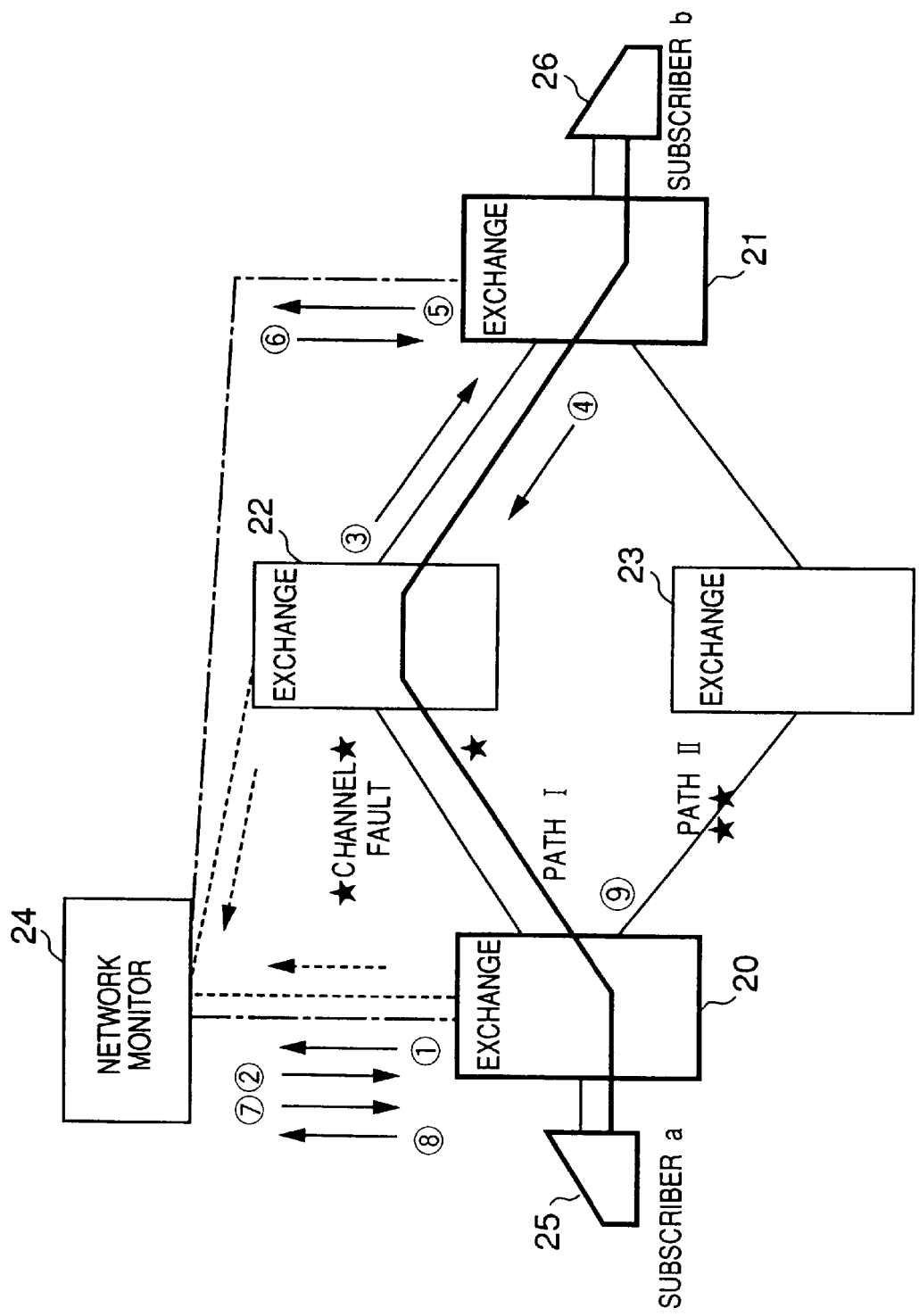
FIG. 15 is an illustration for explaining a control sequence according to the present invention.
Figure 16:
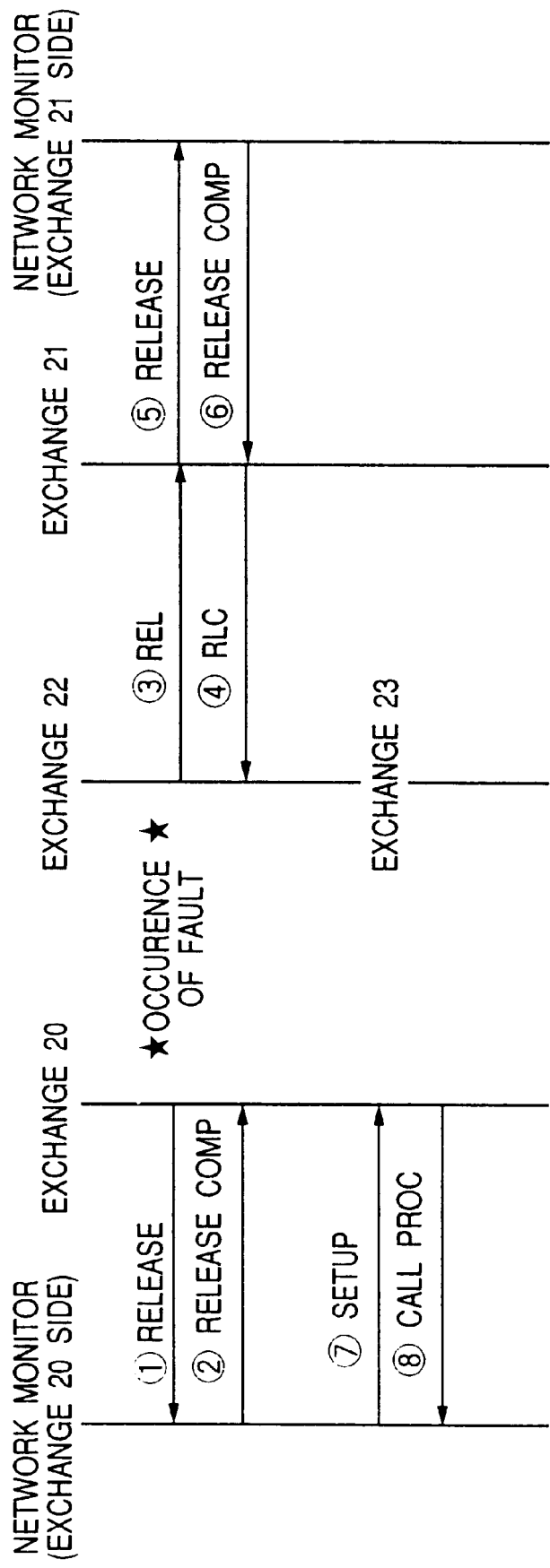
FIG. 16 is a sequence chart of the control sequence according to the present invention.

A description will now be given, with reference to FIGS. 15 and 16, of a reestablishment of the permanent virtual connection when a fault occurs in a part of a connection between the subscribers 25 and 26 via the exchanges 20, 22 and 21. It is assumed that the fault occurs in the channel between the exchanges 20 and 22 and the channel between the exchangers 20 and 23. In this case, the path priority table and the path state table become as shown in FIGS. 14A and 14B, respectively. In this case, a notification of the occurrence of the fault in the channel directed to the exchange 22 is sent to the network monitor 24 from the exchange 20, and a notification of the occurrence of the fault in the channel toward the exchange 20 is sent to the network monitor 24 from the exchange 22. In FIGS. 15 an 16, a sequence step number is indicated in a circle.

Sequence Step 1:

The exchange 20 announces a release of the connection of the subscriber 25 to the network monitor 24 by a RELEASE message.

Sequence Step 2:

The network monitor 24 announces completion of the release of the connection to the exchange 20 by a RELEASE COMP message.

Sequence Step 3:

The exchange 22 announces a release of the connection of the subscriber 25 to the exchange 21 by an REL message.

Sequence Step 4:

The exchange 21 announces completion of the release of the connection to the exchange 22 by an RLC message.

Sequence Step 5:

The exchange 21 announces a release of the connection of the subscriber 26 to the network monitor 24 by a RELEASE message.

Sequence Step 6:

The network monitor 24 announces completion of the release of the connection to the exchange 21 by a RELEASE COMP message. At this time, the network monitor 24 determines that reestablishment of the connection between the subscribers 25 and 26 is needed.

Sequence Step 7:

The network monitor 24 announces to the exchanger 20 the locations of the subscriber 26 and the subscriber 25+the VPI and VCI to be used and the required band value by an information element included in a SETUP message. Thereby, the exchange 20 performs a band allocation for the subscriber 25.

Sequence Step 8:

The exchanger 20 sends a notification of refusal of the reception to the network monitor 24 by a RELEASE COMP message. The exchange 20 selects a path which can reach the subscriber 26, and performs a band allocation for the trunk line. At this time, since it is determined that both the path routing the exchange 22 and the path routing the exchange 23 are not usable in accordance with the table shown in FIG. 14B, there is no path to be selected. That is, the paths I and II in the path state table shown in FIG. 14B are checked by referring the first and second priority paths in the path priority table shown in FIG. 14A, in that turn. As a result, no route is selected, and the establishment of the connection is refused.

Figure 17:
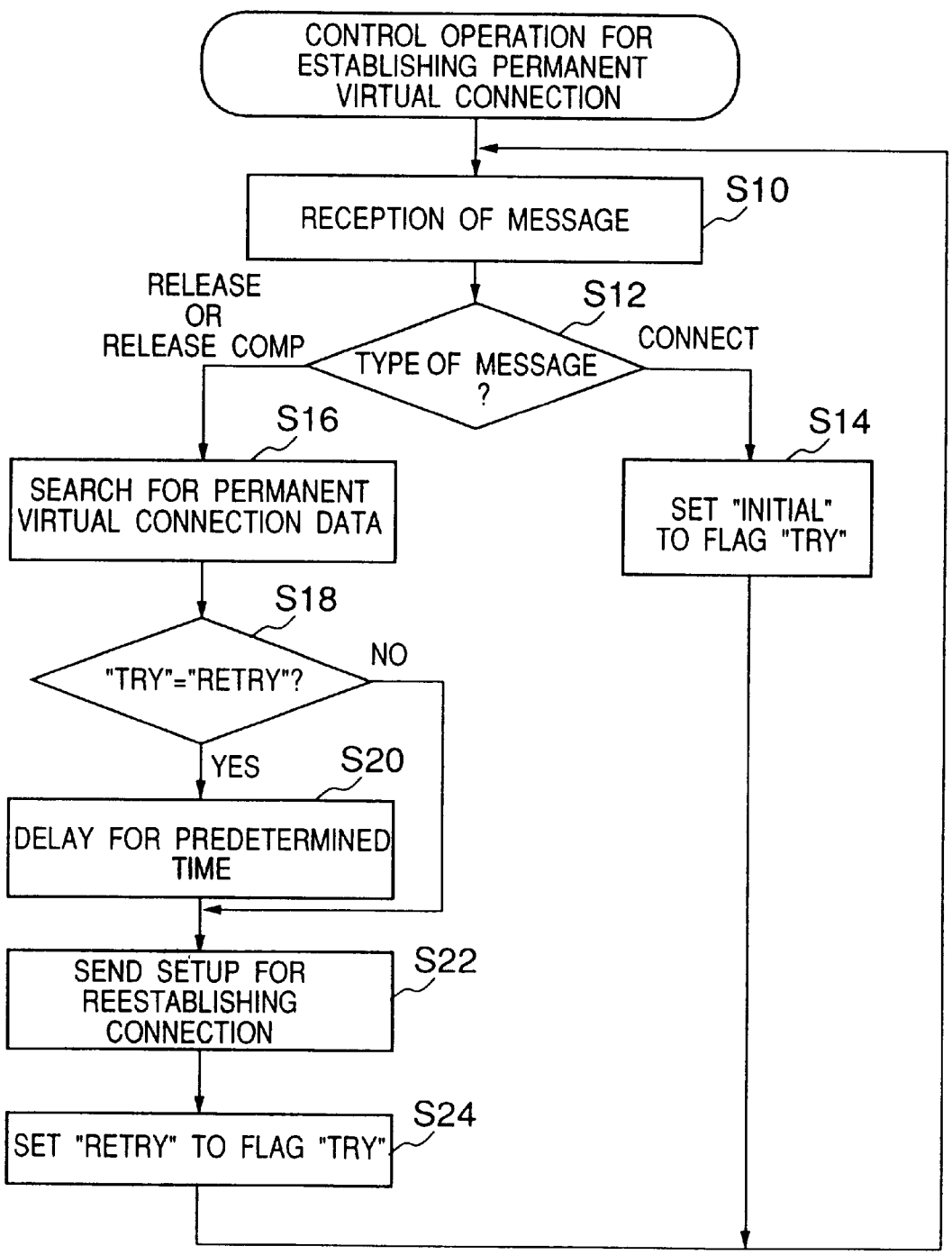
FIG. 17 is a flowchart of an operation for establishing a permanent virtual connection.

FIG. 17 is a flowchart of an operation performed by the permanent connection control unit 34 in the network monitor 24. When the operation shown in FIG. 17 is started, the permanent connection control unit 34 receives, in step S10, a message from the communication control unit 36. Then, in step S12, a type of the message is determined. If the type of the message is CONNECT, the routine proceeds to step S14. In step S14, a flag "TRY", which indicates a state of setting for the permanent virtual connection is set to "INITIAL" since the connection has been established.

On the other hand, if it is determined, in step S12, that the type of message is RELEASE or RELEASE COMP, the routine proceeds to step S16. In step S16, the permanent virtual connection data is searched, and the routine proceeds to step S18. It is then determined, in step S18, whether or not the flag "TRY" is set to "RETRY". If the flag "TRY" is set to "RETRY", the routine proceeds to step S20. In step S20, a predetermined time period is passed. Then, instep S22, a SETUP message is sent from the communication control unit 36 to the corresponding exchange so as to reestablish the connection. Thereafter, the flag "TRY" is set to "RETRY", and the routine returns to step S10.

That is, when the state of the path is changed from a communicable state to an incommunicable state, a reestablishment of the connection is attempted. However, if the state of the path is not changed to the communicable state and remains in the incommunicable state while the second attempt for the reestablishment, a predetermined time period is passed to prevent increase in the number of ineffective attempts for the reestablishment. This is to prevent unnecessary load from being applied to the network monitor 24 and each of the exchanges.

Figure 18:
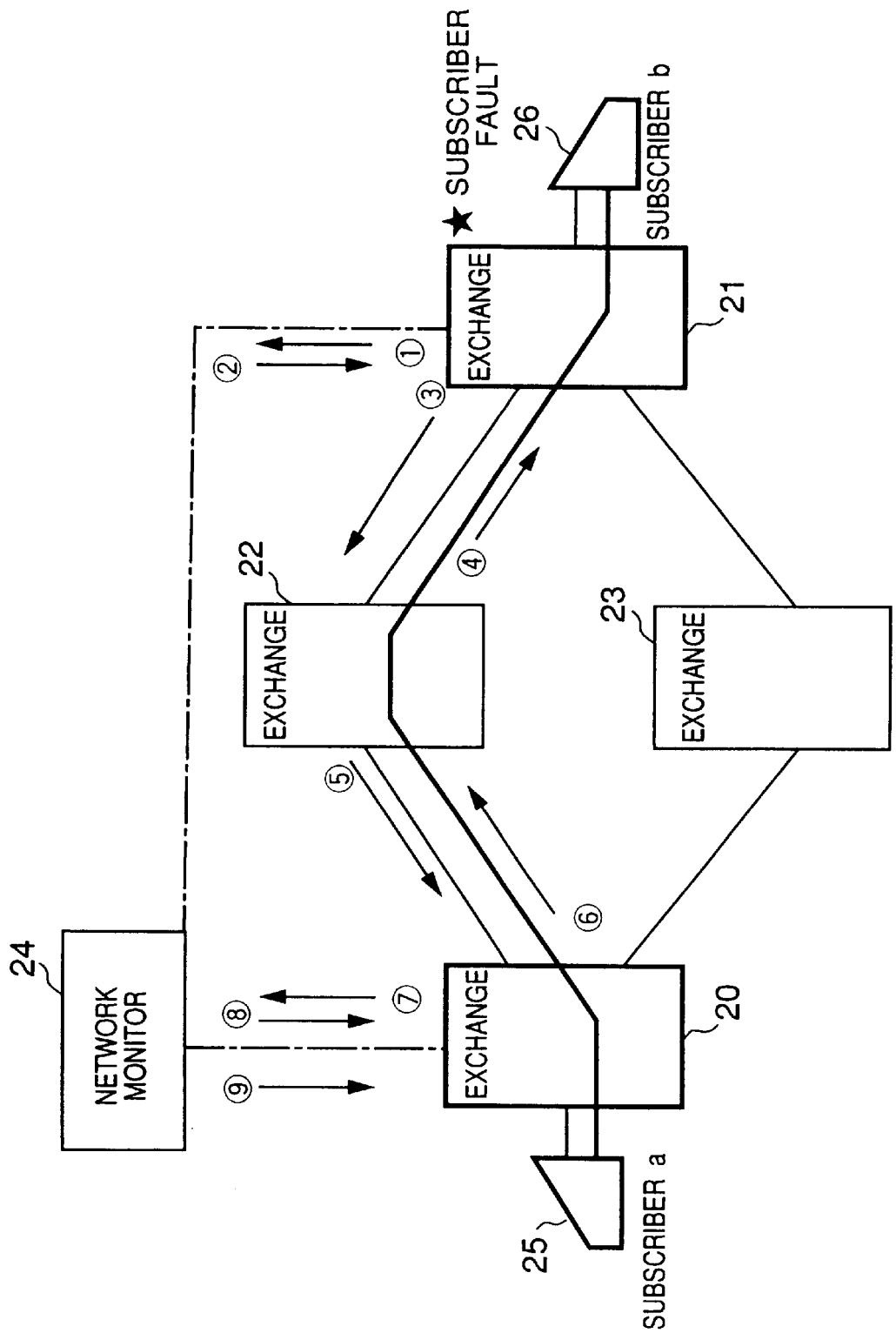
FIG. 18 is an illustration for explaining a control sequence according to the present invention.

A description will now be given, with reference to FIGS. 18 and 19, of a prevention of a reestablishment of the permanent virtual connection when a fault occurs in the subscriber 26. In this case, if the exchange 21 detects a fault occurring in the subscriber 26, the fault of the subscriber 26 is announced to the network monitor 24 via the maintenance communication line 38. In FIGS. 18 an 19, a sequence step number is indicated in a circle.

Sequence Step 1:

The exchange 21 announces a release of the connection of the subscriber 26 to the network monitor 24 by a RELEASE message.

Sequence Step 2:

The network monitor 24 announces completion of the release of the connection to the exchange 21 by a RELEASE COMP message.

Sequence Step 3:

The exchange 21 announces a release of the connection to the exchange 22 by an REL message.

Sequence Step 4:

The exchange 22 announces completion of the release of the connection to the exchange 21 by an RLC message.

Sequence Step 5:

The exchange 22 announces a release of the connection to the exchange 20 by a REL message.

Sequence Step 6:

The exchange 20 announces completion of the release of the connection to the exchange 22 by an RLC message.

Sequence Step 7:

The exchange 20 announces a release of the connection of the subscriber 25 to the network monitor 24.

Sequence Step 8:

The network monitor 24 announces completion of the release of the connection to the exchange 20 by a RELEASE COMP message At this time, since the network monitor recognizes the subscriber 26 having a fault, the operation for reestablishing the connection is prevented.

Thereafter, if a notification of a recovery of the fault is sent from the exchange 21 via the maintenance communication line 38, the network monitor 24 recognizes the recovery of the fault of the subscriber 26. Then, the reestablishing operation is started.

Sequence Step 9:

The exchange 20 announces the locations of the subscriber 26 and the subscriber 25+the VPI and VCI to be used and the required band value by an information element included in a SETUP message.

As mentioned above, the network monitor 24 stores the subscriber location information of the exchanges 20 and 21 and the virtual path identifier and the virtual path identifier as the permanent virtual connection management information. That is, the network monitor 24 is not required to store information related to the exchanges 22 and 23 which are locates in the middle of each of the connections. Thus, an amount of information stored in the network monitor 24 is reduces. Additionally, the connection between the exchanges 20 and 21, which are opposite ends of the connection, can be set in accordance with the path priority table and the path state table so that one of the exchanges is connected to the next exchange having a higher priority for the connection and located in a right direction.

Additionally, an interruption of service can be recovered in a short time by performing the reestablishment of the connection in a short time since a path to the exchange located in a right direction can be selected from the path state table when the reestablishment of the connection is performed. If the path is incommunicable state when reestablishment is performed, unnecessary increase in a load applied to the network monitor and each of the exchanges located opposite ends of the connection by delaying the reestablishment of the connection for a predetermined time. Further, if a fault occurs in the subscriber, the reestablishment of the connection is prohibited since the reestablishment of the connection is unable. Thus, unnecessary increase in a load applied to the network monitor and each of the exchanges located opposite ends of the connection can be prevented. Since the reestablishment of the connection is performed immediately after the fault of the subscriber is recovered, the interruption of service can be minimized.

It should be noted that a start and a stop of the establishment and reestablishment of the connection can be instructed by inputting a maintenance order through the input/output device 31 shown in FIG. 5. Thus, an operator can control a start and stop of the service by inputting the maintenance order.

The present invention is not limited to the specifically disclosed embodiments, and variations and modifications may be made without departing from the scope of the present invention.

What is claimed is:

1. A method for controlling an establishment of a permanent virtual connection in an ATM network which includes a plurality of exchanges, connections between the exchanges being monitored and controlled by a network monitor, the method comprising the steps of:

a) storing permanent virtual connection information in said network monitor, the permanent virtual connection information including location information with respect to subscribers connected to the exchanges at opposite ends of the permanent virtual connection, the permanent virtual connection information further including a virtual path identifier and a virtual channel identifier;

b) establishing a connection between said network monitor and each of said exchanges at opposite ends of the permanent virtual connection to be established in accordance with a third party call control;

c) sending the permanent virtual connection information to one of said exchanges at opposite ends of the permanent virtual connection to be established; and d) establishing a connection between said exchanges at opposite ends of the permanent virtual connection.

2. The method as claimed in claim 1, wherein each of the plurality of exchanges includes table information with respect to a priority order and a state of paths connected to other exchanges so that the connection is established by selecting one of other exchanges in accordance with said table information.

3. The method as claimed in claim 2, further comprising the steps of:

e) announcing a release of the permanent virtual connection to said network monitor from said exchanges at opposite ends of the permanent virtual connection when the permanent virtual connection has become an incommunicable state;

f) reestablishing the connection between said network monitor and each of said exchanges at opposite ends of the permanent virtual connection;

g) sending the permanent virtual connection information to one of said exchanges at opposite ends of the permanent virtual connection which has been released; and h) reestablishing the connection between said exchanges at opposite ends of the permanent virtual connection which has been released.

4. The method as claimed in claim 3, wherein a second attempt for a reestablishment of the permanent virtual connection is delayed for a predetermined time when a first attempt for the reestablishment has failed.

5. The method as claimed in claim 3, wherein a reestablishment of the permanent virtual connection is prohibited when a notification is sent to said network monitor that a fault occurs in one of the subscribers related to the permanent virtual connection which is in the incommunicable state.

6. The method as claimed in claim 5, wherein a reestablishment of the connection between said exchanges at opposite ends of the permanent virtual connection is started when a notification is received that the fault of said one of said subscriber has been recovered.

7. The method as claimed in claim 1, wherein a start and stop of an establishment of the permanent virtual connection is instructed by a maintenance order input to said network monitor.

8. The method as claimed in claim 3, wherein a start and stop of a reestablishment of the permanent virtual connection is instructed by a maintenance order input to said network monitor.

9. A method for controlling an establishment of a permanent virtual connection in an ATM network which includes a plurality of exchanges, a communication is performed between two of the exchanges through the permanent virtual connection routing a plurality of the exchanges, connections between the exchanges being monitored and controlled by a network monitor, the method comprising the steps of:

a) sending a request for setting a connection between the exchanges which are connected to terminals which performs a communication with each other via the permanent virtual connection when a fault occurs in the permanent virtual connection;

b) setting a connection between said one of said exchanges which received said request and the other one of said exchanges by routing a different path; and c) recognizing said connection set in step b) as a new permanent virtual connection so that said network monitor monitors and controls the connection between said exchanges based on information with respect to the new permanent virtual connection.

* * * * *